(12) United States Patent
Gulick, Jr.

(10) Patent No.: US 9,039,785 B2
(45) Date of Patent: May 26, 2015

(54) SECURITY DEVICE FOR FUNCTIONAL DISPLAY, SECURITY, AND CHARGING OF HANDHELD ELECTRONIC DEVICES

(75) Inventor: Franklyn W. Gulick, Jr., Binghamton, NY (US)

(73) Assignee: Scorpion Security Products, Inc., Binghamton, NY (US)

( * ) Notice: Subject to any disclaimer, the term of this patent is extended or adjusted under 35 U.S.C. 154(b) by 2 days.

(21) Appl. No.: 13/984,461

(22) PCT Filed: Feb. 8, 2012

(86) PCT No.: PCT/US2012/024268
§ 371 (c)(1),
(2), (4) Date: Aug. 8, 2013

(87) PCT Pub. No.: WO2012/109316
PCT Pub. Date: Aug. 16, 2012

(65) Prior Publication Data
US 2013/0318639 A1    Nov. 28, 2013

Related U.S. Application Data

(60) Provisional application No. 61/440,646, filed on Feb. 8, 2011.

(51) Int. Cl.
*G08B 21/00* (2006.01)
*G06F 21/88* (2013.01)
*G08B 13/14* (2006.01)

(52) U.S. Cl.
CPC ............ *G06F 21/88* (2013.01); *G08B 13/1445* (2013.01); *G08B 13/149* (2013.01)

(58) Field of Classification Search
None
See application file for complete search history.

(56) References Cited

U.S. PATENT DOCUMENTS

| | | |
|---|---|---|
| 19,622 A | 3/1858 | Clark |
| 242,959 A | 6/1881 | Naglee |
| 297,981 A | 5/1884 | Francis |
| 339,072 A | 3/1886 | Nies |
| 351,550 A | 10/1886 | Weller |
| 528,557 A | 11/1894 | Peabody |
| 685,078 A | 10/1901 | Willringhaus |
| 762,070 A | 6/1904 | Longard |
| 774,810 A | 11/1904 | Willis |
| 887,103 A | 5/1908 | Lane |
| 1,075,384 A | 10/1913 | Seidel |

(Continued)

FOREIGN PATENT DOCUMENTS

| | | |
|---|---|---|
| EP | 0944148 | 3/1999 |
| JP | 08-156945 | 6/1996 |
| WO | WO2011032147 | 3/2011 |

OTHER PUBLICATIONS

International Search Report and Written Opinion of the International Searching Authority, PCT/US2012/024268; Applicant: Scorpion Security Products, Inc. et al., Mailed Sep. 19, 2012, 8 pages.

*Primary Examiner* — Brandon Hoffman
(74) *Attorney, Agent, or Firm* — Hiscock & Barclay LLP

(57) ABSTRACT

A security device for functional display, security, and charging of a handheld electronic device is disclosed. The device comprises a universal clamping apparatus with an integrated alarm sensor and charging port to prevent theft of handheld electronic devices without hindering customer inspection thereof while providing charging of the battery of the devices.

19 Claims, 7 Drawing Sheets

(56) References Cited

U.S. PATENT DOCUMENTS

| | | | |
|---|---|---|---|
| 1,402,621 A | 1/1922 | Kesslering et al. | |
| 1,586,314 A | 5/1926 | Kiefer | |
| 1,709,385 A | 4/1929 | Young | |
| 2,094,225 A | 9/1937 | Tuttle | |
| 2,114,227 A | 4/1938 | Kriss | |
| 2,225,273 A | 12/1940 | Jacobs | |
| 2,424,871 A | 7/1947 | Wenk et al. | |
| 2,552,094 A * | 5/1951 | Hamon et al. | 269/156 |
| 2,610,661 A | 9/1952 | Romine | |
| 2,716,362 A | 8/1955 | Novak | |
| 3,741,517 A | 6/1973 | Pogonowski | |
| 3,855,825 A | 12/1974 | Pickard | |
| 4,083,547 A | 4/1978 | Gurley | |
| 4,234,176 A | 11/1980 | Goff et al. | |
| 5,052,199 A | 10/1991 | Derman | |
| 5,246,183 A | 9/1993 | Leyden | |
| 5,463,688 A | 10/1995 | Wijas | |
| 5,555,302 A | 9/1996 | Wang | |
| 5,680,782 A | 10/1997 | Komatsu et al. | |
| RE35,677 E | 12/1997 | O'Neill | |
| 5,697,601 A | 12/1997 | Gurule | |
| 5,825,874 A | 10/1998 | Humphreys et al. | |
| 5,848,562 A * | 12/1998 | Somma | 82/158 |
| 5,863,033 A | 1/1999 | Bradford | |
| 5,893,553 A | 4/1999 | Pinkous | |
| 5,903,645 A | 5/1999 | Tsay | |
| 6,000,686 A | 12/1999 | Yates | |
| 6,002,921 A | 12/1999 | Pfahlert et al. | |
| 6,161,823 A | 12/2000 | Bradford | |
| 6,176,479 B1 | 1/2001 | Hicklin | |
| 6,199,804 B1 | 3/2001 | Donofrio, Jr. | |
| 6,220,589 B1 | 4/2001 | Smith, III et al. | |
| 6,237,375 B1 | 5/2001 | Wymer | |
| 6,659,382 B2 | 12/2003 | Ryczek | |
| 6,690,277 B1 | 2/2004 | Hansen et al. | |
| 6,848,662 B2 | 2/2005 | Paramonoff et al. | |
| 7,111,764 B2 | 9/2006 | Smith et al. | |
| 7,197,962 B2 | 4/2007 | Williams | |
| 2003/0106971 A1 | 6/2003 | Leyden et al. | |
| 2004/0231376 A1 | 11/2004 | Leyden et al. | |
| 2004/0261473 A1 | 12/2004 | Avganim | |
| 2005/0001485 A1 | 1/2005 | Pail | |
| 2005/0028571 A1 | 2/2005 | Merrem et al. | |
| 2006/0187033 A1 * | 8/2006 | Hall et al. | 340/539.22 |
| 2007/0157495 A1 | 7/2007 | Yang | |
| 2008/0186686 A1 | 8/2008 | Buck et al. | |
| 2009/0079566 A1 | 3/2009 | Goldstein et al. | |
| 2010/0194568 A1 | 8/2010 | Irmscher et al. | |

* cited by examiner

SECURITY DEVICE FOR FUNCTIONAL DISPLAY, SECURITY, AND CHARGING OF HANDHELD ELECTRONIC DEVICES

CROSS-REFERENCE TO RELATED APPLICATIONS

This application claims priority from, and is a national stage application pursuant to 35 U.S.C. §371 of, PCT Application No. PCT/US2012/024268, filed Feb. 8, 2012, and entitled Security Device For Functional Display, Security, And Charging Of Handheld Electronic Devices, the entire contents of which is herein incorporated by reference. PCT Application No. PCT/US2012/024268 claims priority from U.S. Provisional Patent Application Ser. No. 61/440,646, filed Feb. 8, 2011, the entire contents of which is herein incorporated by reference.

FIELD OF THE INVENTION

The invention relates to a security device for allowing functional display and charging of handheld electronic devices.

BACKGROUND OF THE INVENTION

Retailers sell handheld electronic devices to the public in a range of shapes and sizes, with a range of functionality. Encouraging customers to pick up, hold, examine, and use the functionality of the devices at display locations is a valuable marketing technique employed by retailers. To decrease the risk of theft associated with this marketing strategy, retailers employ various security measures.

One common security measure is the use of an alarm sensor that sets when placed in contact with the surface of the handheld electronic device and activates when it loses contact with the device (e.g., when the sensor is removed). A typical alarm sensor is attached to one portion of the handheld electronic device using an adhesive tape or similar adhesive product. During use, the adhesives often fail, resulting in the alarm sensor losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm sensors are only activated when the alarm sensor loses contact with the portion of the handheld electronic devices to which it has been attached. For example, if the alarm sensor is attached to the battery cover of a wireless phone, a thief can remove and steal the remainder of the wireless phone (i.e., all components but the battery cover) without activating the alarm sensor. In order to combat this, retailers often install a plurality of alarm sensors in multiple locations on the handheld electronic devices (e.g., front and back, inside the battery compartment, etc.). These alarm sensors often hinder customer inspection of the device. In some cases, these alarm sensors installed within the handheld electronic devices can ignite when subjected to excessive heat within the devices.

In addition to preventing theft of handheld electronic devices, in order to ensure that the devices on display are functional, retailers need to provide charging of the devices on a regular basis so that customers can operate the devices. In many instances, this charging requirement is provided by a separate charging device that can also hinder access to the handheld electronic device and present a visually unappealing display.

The discussion above is merely provided for a general background information and is not intended to be used as an aid in determining the scope of the claimed subject matter.

SUMMARY OF THE INVENTION

A security device for functional display, security, and charging of a handheld electronic device is disclosed. The device comprises a universal clamping apparatus with an integrated alarm sensor switch and charging port to prevent theft of handheld electronic devices without hindering customer inspection thereof while providing charging of the battery of the devices.

In one embodiment, the security device a body having a first side, a second side, and an upper surface, a first arm extending upwardly from the first side of the body and having a distal end, wherein the distal end of the first arm has a first retention hook extending substantially horizontally from the distal end of the first arm above the plane of the upper surface of the body, a second arm extending upwardly from the second side of the body and having a distal end, wherein the distal end of the second arm has a second retention hook extending substantially horizontally from the distal end of the second arm above the plane of the upper surface of the body, a draw pin extending through the first side and the second side of the housing body for moving the first arm and second arm simultaneously along an X-axis relative to the first side and the second side of the body, wherein the draw pin comprises a first threaded end and second threaded end, wherein the first threaded end has a thread pattern that is counter rotational to the thread pattern of the second threaded end, a leveling plate located between the first arm and the second arm and proximate to the upper surface of the body, wherein the leveling plate is connected to the body using one or more leveling screws to allow the leveling plate to move independently of the body along a Z-axis relative to the upper surface of the body, an alarm sensor on the leveling plate that sets when placed in contact with a surface of the handheld electronic device, wherein the alarm sensor can activate when the alarm sensor loses contact with the handheld electronic device, and a charging port on the body for charging the handheld electronic device.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Different parts are indicated with different numerals. Thus, for further understanding of the invention, reference can be made to the following detailed description, read in connection with the drawings in which.

DETAILED DESCRIPTION OF THE INVENTION

Figure 1:
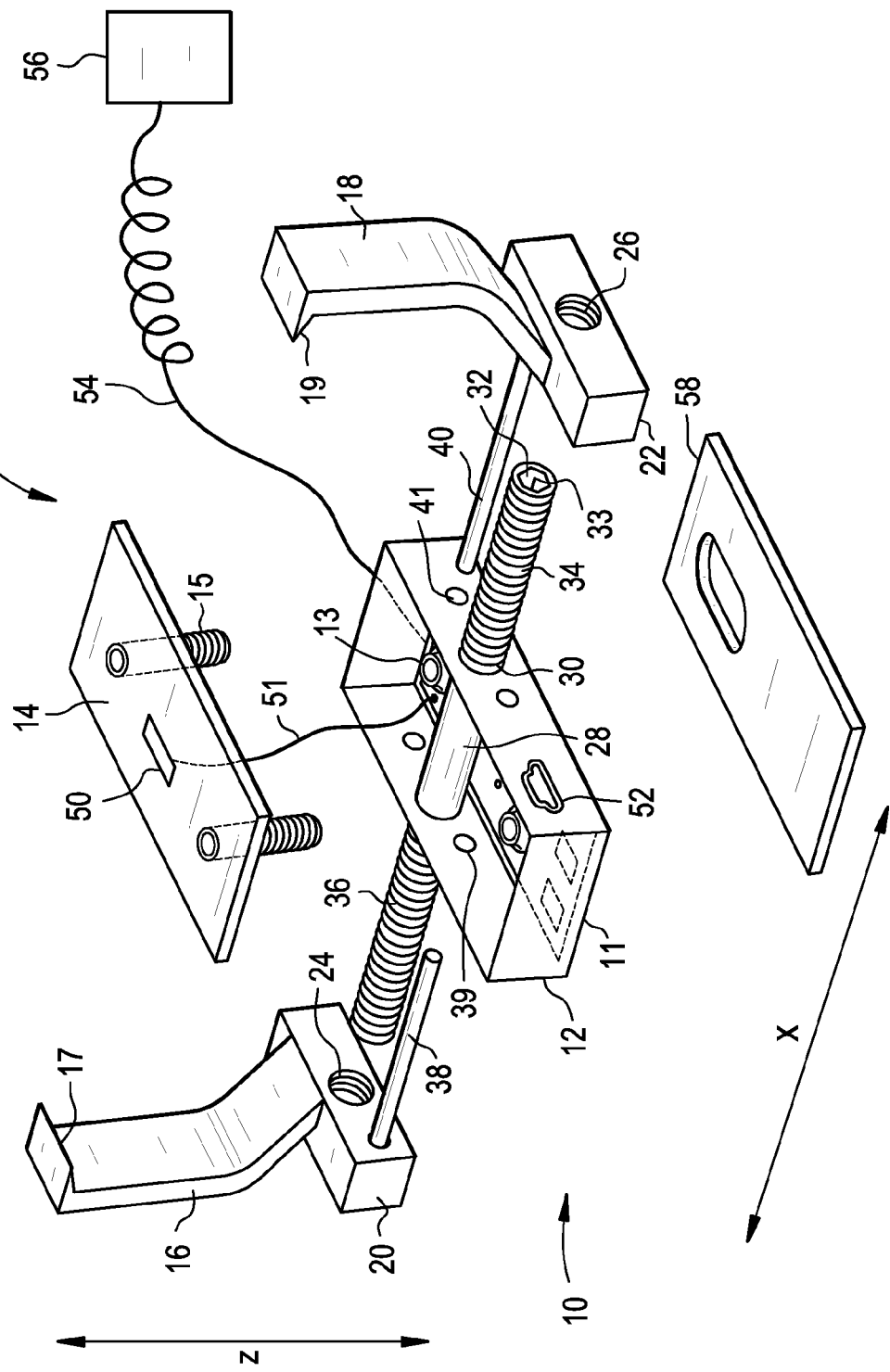
FIG. 1 is an exploded perspective view of an exemplary embodiment of a security system including a security device.
Figure 2:
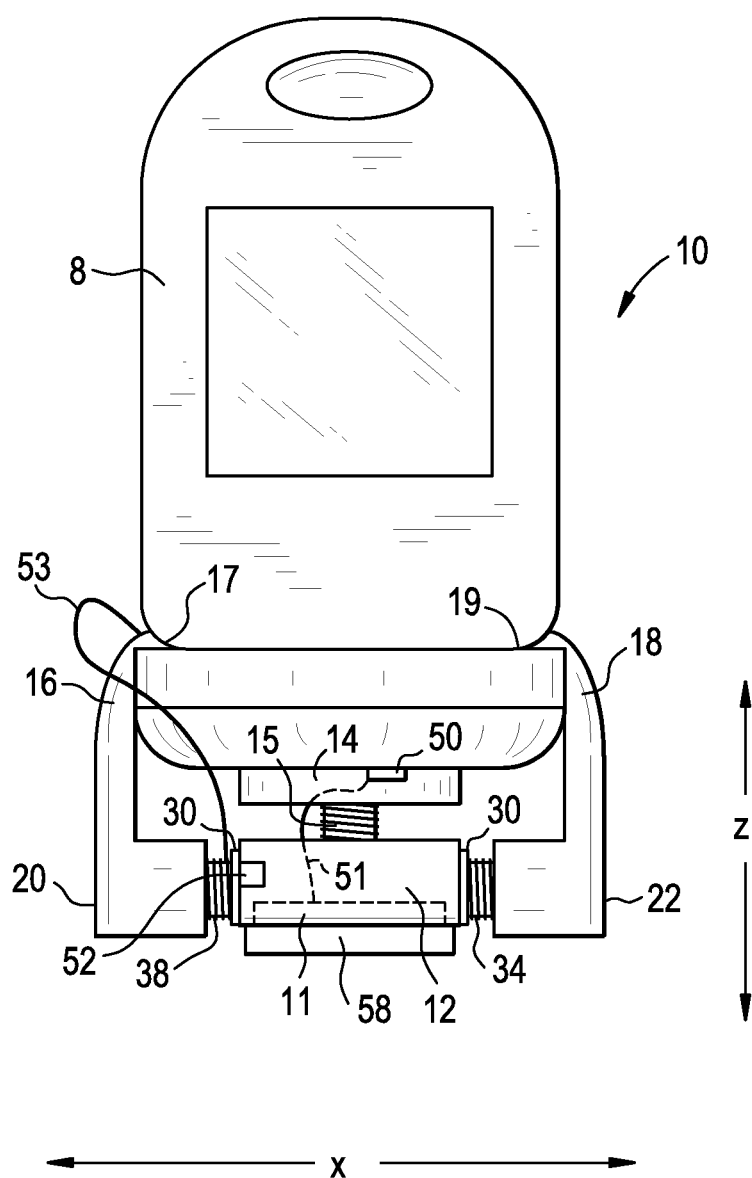
FIG. 2 is a front view of the exemplary embodiment of a security device of FIG. 1.

FIG. 1 is an exploded perspective view of an exemplary embodiment of a security system 100, including a security device 10 for functional display, security, and charging of a handheld electronic device (not shown). FIG. 2 is a front view of the exemplary embodiment of a security device 10 of FIG. 1. The security device 10 comprises a housing body 12, a moveable leveling plate 14 proximate to the upper surface (not shown in FIG. 1) of the housing body 12, a first moveable arm 16 extending upwardly from a first arm base 20 proximate to the first side of the housing body 12, and a second moveable arm 18 extending upwardly from the second side of the housing body 12. Leveling plate 14 moves vertically in alignment with the Z axis between the first moveable arm 16 and the second moveable arm 18. First moveable arm 16 and second moveable arm 18 move horizontally in alignment with the X axis. The first moveable arm 16 includes a first arm base 20 at its proximal end and has a first retention hook 17 extending substantially horizontally from the distal end of the first moveable arm 16 above the plane of the upper surface of the housing body 12. The second moveable arm 18 includes a second arm base 22 at its proximal end and has a second retention hook 19 extending substantially horizontally from the distal end of the second moveable arm 18 above the plane of the upper surface of the housing body 12.

The horizontal movement (i.e., extending and retracting) of first moveable arm 16 and second moveable arm 18 along the X axis is controlled by the rotation of draw pin 28, which extends through the first side and the second side of the housing body 12 and includes two threaded ends 34, 36, each of which is machined with a thread pattern that is counter rotational to the other. Correspondingly, threaded hole 24 in first arm base 20 and threaded hole 26 in second arm base 22 are each machined with a thread pattern that is counter rotational to the other. In operation, threaded end 36 is complementary to and inserted in threaded hole 24, while threaded end 34 is complementary to and inserted in threaded hole 26. The draw pin 28 is held in place by lock washers 30, which are attached at opposing end portions of draw pin 28 and so positioned to abut the side walls of the housing body 12.

Figure 7:
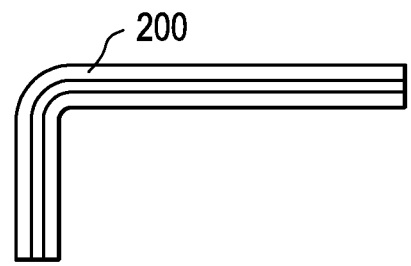
FIG. 7 is a plan view of an exemplary hex tool according to an exemplary embodiment of the invention.
Figure 8:
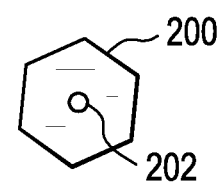
FIG. 8 is an end view of the exemplary hex tool shown in FIG. 7.

The rotation of draw pin 28 is controlled by inserting a suitable tool into hex key hole 32 at the tip of threaded end 34 of draw pin 28. Disposed with hex key hole 32 is a security pin 33 that can be turned by a tool. FIG. 7 is a plan view of a tool 200 according to an exemplary embodiment of the invention. Tool 200 can comprise a hex wrench for engaging hex key hole 32 of draw pin 28. FIG. 8 is an end view of tool 200 shown in FIG. 7. As shown in FIG. 8, tool 200 can have a drilled aperture 202 to receive and surround the security pin 33. Returning to FIGS. 1 and 2, when the hex tool 200 is inserted and rotated clockwise, draw pin 28 is simultaneously rotated in a clockwise direction. This screws the opposing threaded ends 34 and 36 into threaded holes 26 and 24, respectively, which serves to move first moveable arm 16 and second moveable arm 18 towards one another, and retracting towards the center of the housing body 12. Conversely, when draw pin 28 is rotated in a counter clockwise direction, first moveable arm 16 and second moveable arm 18 are moved away from each other, and extending away from the center of the housing body 12. In this fashion, first moveable arm 16 and second moveable arm 18, as well as retention hooks 17 and 19, can be infinitely adjusted to clamp onto and securely hold the sides and top edges of a handheld electronic device 8. Although shown as a cell phone in ht exemplary embodiment, it will be understood the security device can be used for a variety of handheld electronic devices, such as wireless phones, personal digital assistants (PDAs), radios, scanners, pagers, GPS systems, multimeters, cameras, music players, power tools, calculators, handheld computers such as netbooks, notebooks, laptops, electronic tablets, and electronic readers, and other similar handheld electronic devices.

Figure 3:
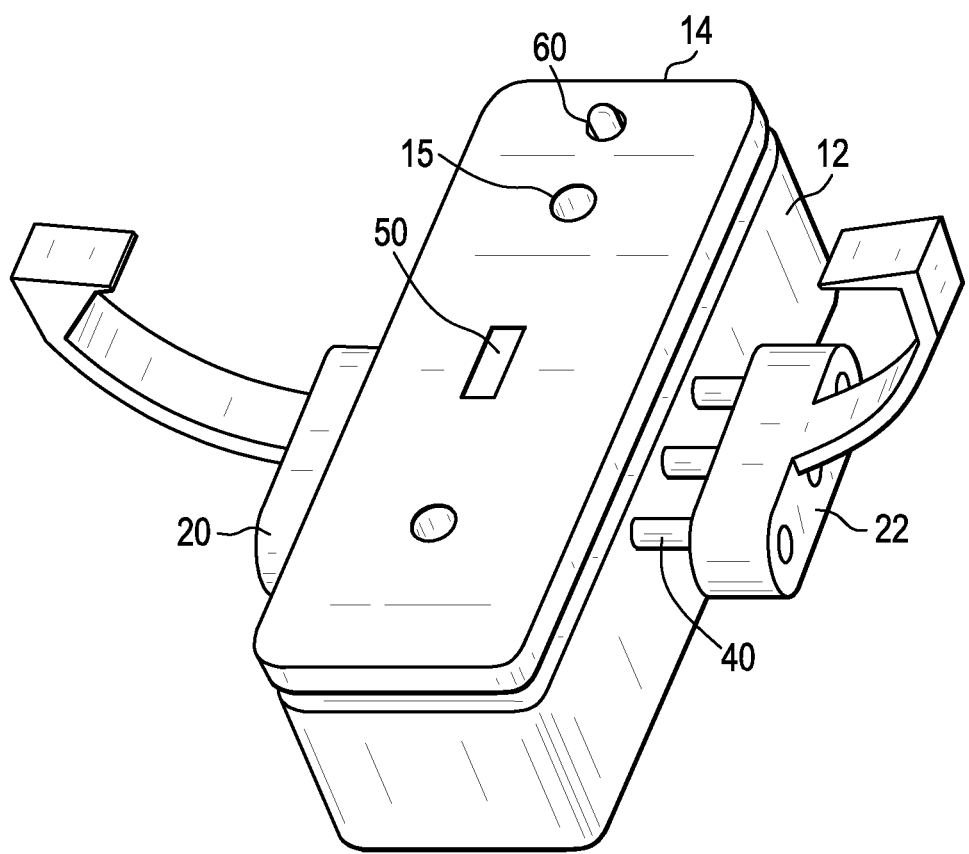
FIG. 3 is a perspective view of another exemplary embodiment of a security device.

Locator pins 38 and 40 are fixedly attached to arm bases 20 and 22, respectively. Locator pin 38 extends through locator hole 39; locator pin 40 extends through locator hole 41. Each pin 38, 40 is parallel to the axis of draw pin 28, and in the same plane thereof. As draw pin 28 is rotated, thereby moving first moveable arm 16 and second moveable arm 18 into a wider or narrower adjustment state, locater pins 38 and 40 slide correspondingly through locator holes 39 and 41. Locator pins 38 and 40 function as stabilizer means to prevent arm bases 20 and 22 from deviating from their fixed alignment, which in turn maintains the perpendicular alignment of first moveable arm 16 and second moveable arm 18 as they move through various states of adjustment as described above. While the exemplary embodiment shown in FIGS. 1 and 2 has one locator pin 38, 40 per arm base 20, 22, as shown in another exemplary embodiment shown in FIG. 3, each arm base 20 and 22 can have multiple locator pins 40.

Figure 4:
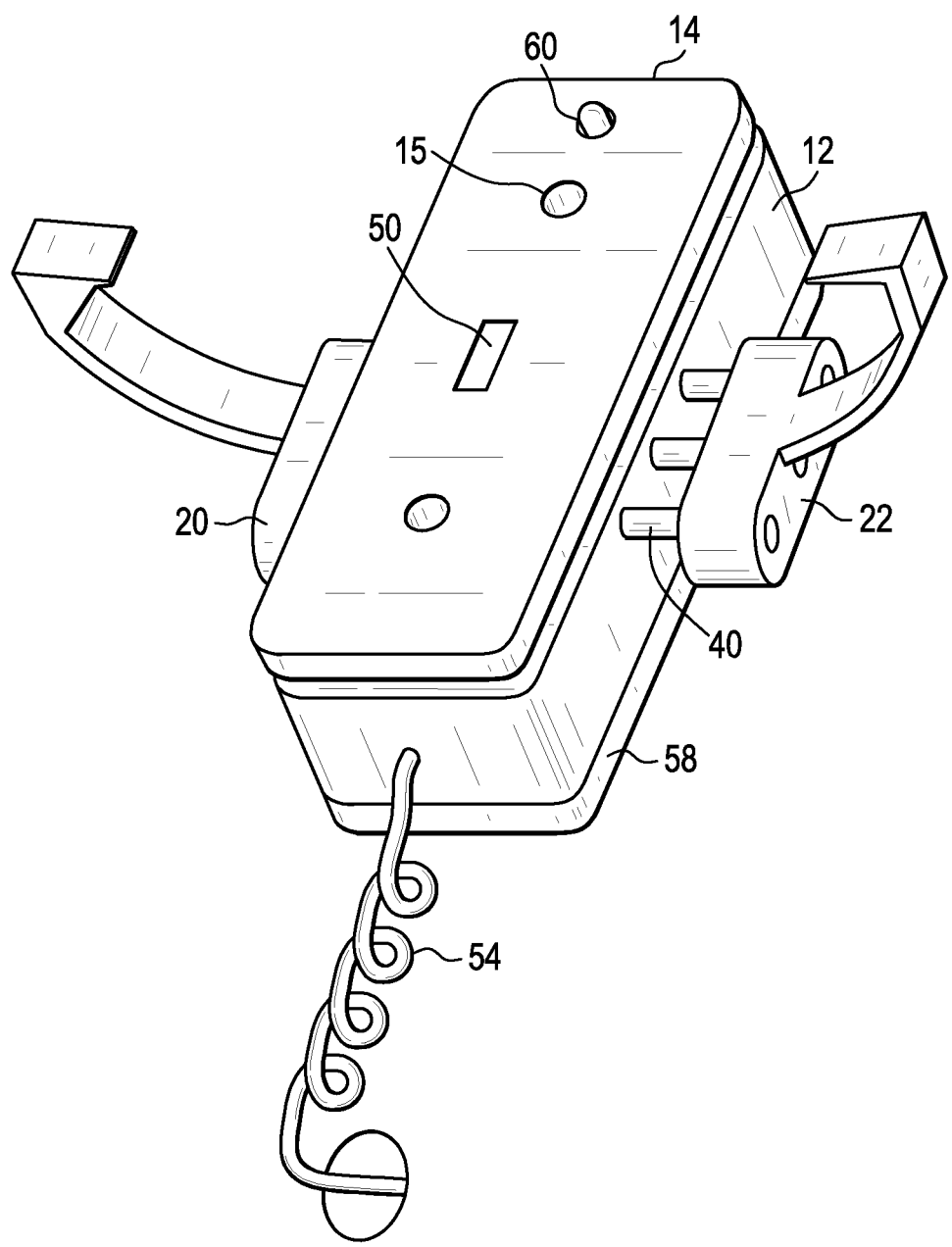
FIG. 4 is a perspective view of another exemplary embodiment of a security device.

Returning to FIGS. 1 and 2, the vertical movement of leveling plate 14 along the Z axis is controlled by the rotation of one or more threaded leveling screws 15, which are fixedly attached to the leveling plate 14. Here, it is important to note that while leveling screws 15 are fixedly attached to leveling plate 14, leveling screws 15 are attached in a manner that allows the full and unencumbered rotation of threaded leveling screws 15 in both clockwise and counter clockwise directions. When leveling screws 15 are rotated clockwise into threaded holes 13, leveling screws 15 rise along the threads of threaded holes 13 in the housing body 12, thereby elevating the end of leveling screws 15 that are fixedly attached to leveling plate 14. The threaded holes 13 are built up on the bottom of the housing body 12 to accept the leveling screws 15. In this manner, leveling plate 14 may be elevated in a gradual and controlled manner above the upper surface of the housing body 12. Conversely, when threaded leveling screws 15 are rotated in a counter-clockwise direction, leveling plate 14 is lowered along the threads of threaded holes 13 in a likewise gradual and controlled manner. Each end of leveling plate 14 may be raised or lowered, by alternate turn in graduated increments, thereby raising or lowering plate 14 in a level manner. This allows leveling plate 14 to function substantially as a screw type jack to elevate handheld electronic device 8 and press it securely against retention hooks 17 and 19, thereby holding the device 8 fixedly between leveling plate 14 and retention hooks 17, 19. In another embodiment, the leveling plate 14 can be raised and lowered using one leveling screw 15. As shown in FIGS. 1, 2, and 4, the bottom surface of the housing body 12 can be inserted into mount 58, where it is detachably attached allowing a customer to inspect and use the handheld electronic device 8.

Figure 5:
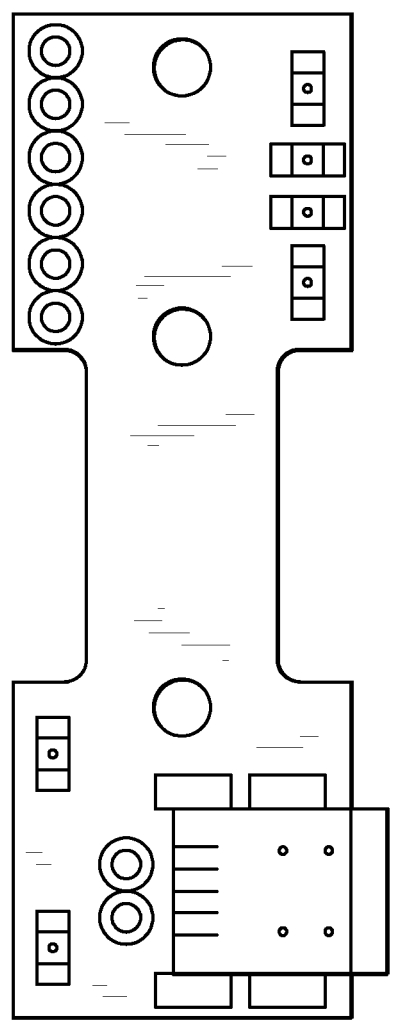
FIG. 5 is an exemplary embodiment of a printed circuit board.

While the features of the security device 10 described above provide sufficient security against removing the handheld electronic device 8 from the security device 10, retailers often want additional security and functionality from their display devices. For example, if a tether or other cord holding the security device 10 were cut, absent other security features, a thief may be able to remove handheld electronic device 8 perhaps without the knowledge of the retailer. To provide additional security, in one embodiment of the invention as shown in FIGS. 1 through 4, an alarm sensor 50 is provided on the leveling plate 14 that sets when placed in contact with a surface of the handheld electronic device 8 and will activate when the alarm sensor 50 loses contact with the device 8 or is otherwise tampered with. A number of different types of alarm sensors 50 can be used, such as a tape-style or a plunger-style sensor. In one embodiment, the alarm sensor is integrated with and at least partially recessed in the leveling plate. A cable 51 (e.g., containing two wires) can connect the alarm sensor 50 to a printed circuit board (PCB) 11 located in the housing body 12. The cable 51 should be long enough to allow the leveling plate 14 to move vertically as required. FIG. 5 is an exemplary embodiment of a PCB 11. The PCB 11 can monitor the status of the alarm sensor 50 and sound an alarm when the alarm sensor 50 is activated. The alarm can also sound when the tether/cord 54 attached between the housing body 12 and the main terminal 56 is cut or disconnected. The tether/cord 54 can included wiring attached to the printed circuit board 11 or directly to the alarm sensor 50 to monitor the status of the alarm sensor 50. As shown in FIG. 4, the leveling plate 14 can also have an LED 60 for providing a visual status of the alarm. In another embodiment, the housing body 12 can have an LED for providing a visual status of the alarm. Unlike existing alarm sensors that are attached to the handheld electronic device using adhesive tape or similar adhesive product, since the alarm sensor 50 remains in contact with the handheld electronics device 8 by virtue of the device 8 fixedly held between leveling plate 14 and retention hooks 17, 19, the potential for a false alarm is minimized. Furthermore, unlike existing alarm sensors that only secure one part of a handheld electronic device or that must be used in multiple locations on the same handheld electronic device hindering access and functionality, single alarm sensor 50 can be used to secure the entire handheld electronics device 8 by virtue of the device 8 being fixedly held between leveling plate 14 and retention hooks 17, 19.

The housing body 12 of the security device 10 can also incorporate a charging port 52 powered via the tether/cord 54 attached between the housing body 12 and the main terminal 56. As shown in FIG. 2, a charging cable 53 between the handheld electronic device 8 and the charging port (or receptacle) 52 can be used to charge the battery of the handheld electronic device 8. The tether/cord 54 can be plugged into a main terminal 56 that can simultaneously charge one or more handheld electronic devices 8 from a single terminal, which can, e.g., plug into a 110V or other suitable voltage outlet. This main terminal 56 can also provide the power for the security alarms.

Figure 6:
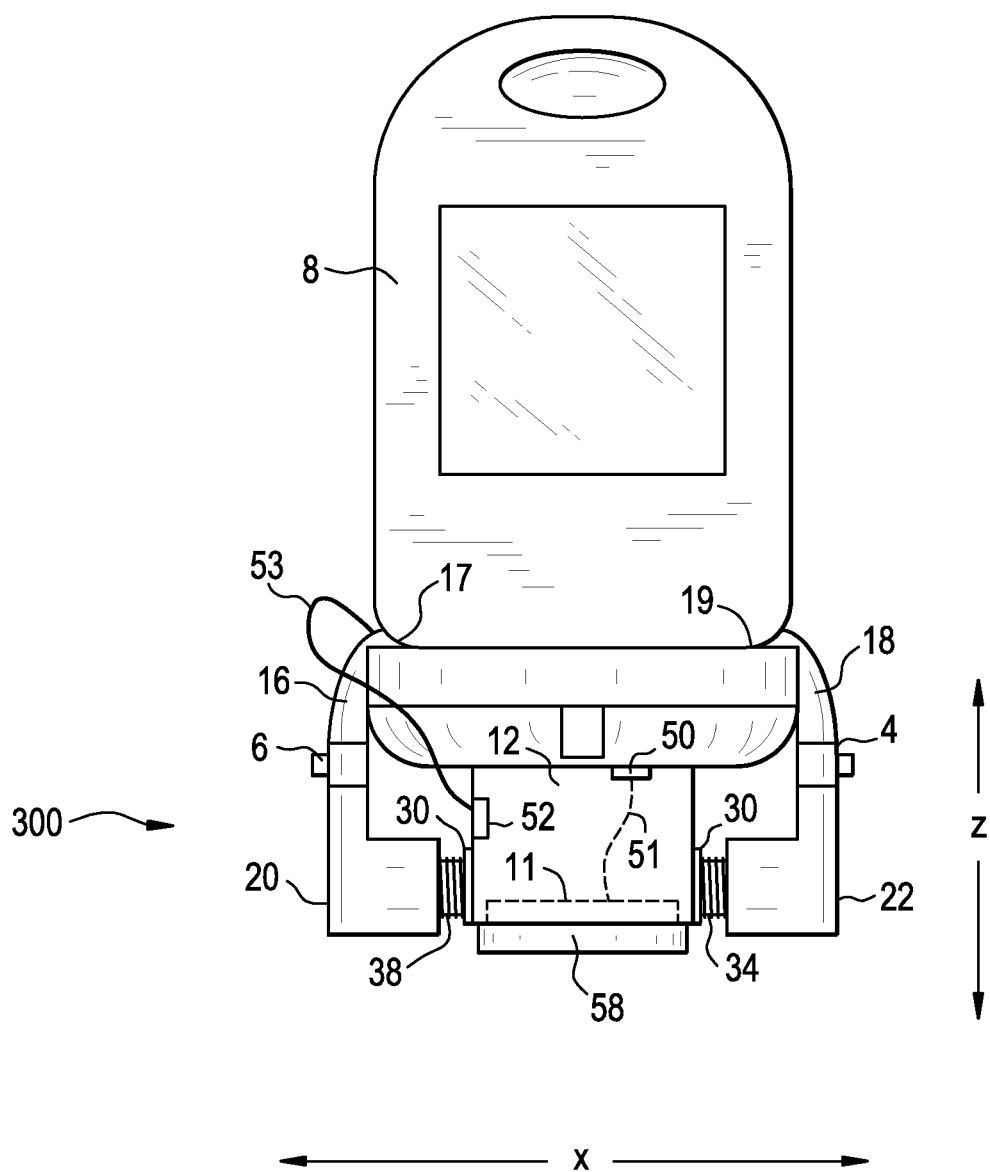
FIG. 6 is a front view of another exemplary embodiment of a security device.

FIG. 6 is a front view of another exemplary embodiment of a security device 300. As compared with the security device 10 of FIGS. 1 through 4, which secures the handheld electronics device 8 by adjusting the height of the leveling plate 14, the exemplary embodiment of the security device 300 in FIG. 6 secures the handheld electronics device 8 by adjusting the height along the z-axis of the and retention hooks 17, 19. In one embodiment, the position of the first retention hook 17 of first moveable arm 16 can be changed to secure the handheld electronic device 8 by using a set screw 6, while the position of the second retention hook 19 of second moveable arm 8 can be changed to secure the handheld electronic device 8 by using a set screw 4.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements it will be understood that the exemplary embodiments can be practiced utilizing either less than or more than the certain number of elements

What is claimed is:

1. A security device for a handheld electronic device comprising:
    a body having a first side, a second side, and an upper surface;
    a first arm extending upwardly from the first side of the body and having a distal end, wherein the distal end of the first arm has a first retention hook extending substantially horizontally from the distal end of the first arm above the plane of the upper surface of the body;
    a second arm extending upwardly from the second side of the body and having a distal end, wherein the distal end of the second arm has a second retention hook extending substantially horizontally from the distal end of the second arm above the plane of the upper surface of the body;
    a draw pin extending through the first side and the second side of the housing body for moving the first arm and the second arm simultaneously along an X-axis relative to the first side and the second side of the body, wherein the draw pin comprises a first threaded end and second threaded end, wherein the first threaded end has a thread pattern that is counter rotational to the thread pattern of the second threaded end;
    a leveling plate located between the first arm and the second arm and proximate to the upper surface of the body, wherein the leveling plate is connected to the body using one or more leveling screws to allow the leveling plate to move independently of the body along a Z-axis relative to the upper surface of the body;
    an alarm sensor on the leveling plate that sets when placed in contact with a surface of the handheld electronic device, wherein the alarm sensor can activate when the alarm sensor loses contact with the handheld electronic device;
    a charging port on the body for charging the handheld electronic device; and
    a tether connected to the body, wherein the tether further comprises wiring for monitoring the status of the alarm sensor.

2. The security device of claim 1, wherein the alarm sensor is integrated with the leveling plate.

3. The security device of claim 2, wherein the alarm sensor is at least partially recessed in the leveling plate.

4. The security device of claim 1, further comprising a circuit board in the housing, wherein the circuit board is connected to and monitors the alarm sensor.

5. The security device of claim 1, further comprising an LED on the leveling plate for providing a visual status of the alarm sensor.

6. The security device of claim 1, further comprising an LED on the body for providing a visual status of the alarm sensor.

7. The security device of claim 1, wherein the alarm sensor is a plunger-style sensor.

8. The security device of claim 1, wherein the alarm sensor is a tape-style sensor.

9. The security device of claim 1, wherein the draw pin is operable with a tool.

10. The security device of claim 9, wherein the tool is a hex wrench.

11. The security device of claim 1, further comprising a security pin at a tip of one of the first threaded end and second threaded end of the draw pin.

12. The security device of claim 1, wherein the draw pin is operable a hex wrench with an aperture for receiving the security pin.

13. The security device for a handheld electronic device of claim 1,
wherein the body further comprises a first end and a second end,
wherein the leveling plate has a first end and a second end,
wherein the first end of the leveling plate is connected to the first end of the body using a first leveling screw and the second end of the leveling plate is connected to the second end of the body using a second leveling screw to allow the first end of the leveling plate and the second end of the leveling plate to move independently of each other and independently of the body along a Z-axis relative to the upper surface of the body,
wherein the first leveling screw is fixedly attached to the first end of the leveling plate and the second leveling screw is fixedly attached to the second end of the leveling plate,
wherein the leveling plate is not integral with the first leveling screw or the second leveling screw,
wherein the first leveling screw is configured to secure the first end of the leveling plate against the back surface of the handheld electronic device and the second leveling screw is configured to secure the second end of the leveling plate against the back surface of the handheld electronic device, and
wherein the leveling plate is configured to apply force to a back surface of the handheld electronic device to secure the first and second retention hooks against a front surface of the handheld electronic device.

14. A security device for a handheld electronic device comprising:
a body having a first side, a second side, and an upper surface;
a first arm extending upwardly from the first side of the body and having a distal end, wherein the distal end of the first arm has a first retention hook extending substantially horizontally from the distal end of the first arm above the plane of the upper surface of the body;
a second arm extending upwardly from the second side of the body and having a distal end, wherein the distal end of the second arm has a second retention hook extending substantially horizontally from the distal end of the second arm above the plane of the upper surface of the body;
a draw pin extending through the first side and the second side of the housing body for moving the first arm and the second arm simultaneously along an X-axis relative to the first side and the second side of the body, wherein the draw pin comprises a first threaded end and second threaded end, wherein the first threaded end has a thread pattern that is counter rotational to the thread pattern of the second threaded end;
a leveling plate located between the first arm and the second arm and proximate to the upper surface of the body, wherein the leveling plate is connected to the body using one or more leveling screws to allow the leveling plate to move independently of the body along a Z-axis relative to the upper surface of the body;
an alarm sensor on the leveling plate that sets when placed in contact with a surface of the handheld electronic device, wherein the alarm sensor can activate when the alarm sensor loses contact with the handheld electronic device;
a charging port on the body for charging the handheld electronic device; and
a tether connected to the body,
wherein the tether further comprises wiring for providing power to the charging port.

15. The security device of claim 14, wherein the draw pin is operable with a tool.

16. The security device of claim 15, wherein the tool is a hex wrench.

17. The security device of claim 14, further comprising a security pin at a tip of one of the first threaded end and second threaded end of the draw pin.

18. The security device of claim 14, wherein the draw pin is operable a hex wrench with an aperture for receiving the security pin.

19. The security device for a handheld electronic device of claim 14,
wherein the body further comprises a first end and a second end,
wherein the leveling plate has a first end and a second end,
wherein the first end of the leveling plate is connected to the first end of the body using a first leveling screw and the second end of the leveling plate is connected to the second end of the body using a second leveling screw to allow the first end of the leveling plate and the second end of the leveling plate to move independently of each other and independently of the body along a Z-axis relative to the upper surface of the body,
wherein the first leveling screw is fixedly attached to the first end of the leveling plate and the second leveling screw is fixedly attached to the second end of the leveling plate,
wherein the leveling plate is not integral with the first leveling screw or the second leveling screw,
wherein the first leveling screw is configured to secure the first end of the leveling plate against the back surface of the handheld electronic device and the second leveling screw is configured to secure the second end of the leveling plate against the back surface of the handheld electronic device, and
wherein the leveling plate is configured to apply force to a back surface of the handheld electronic device to secure the first and second retention hooks against a front surface of the handheld electronic device.

\* \* \* \* \*